United States Patent
Inoue et al.

(10) Patent No.: US 6,502,366 B1
(45) Date of Patent: Jan. 7, 2003

(54) PACKING MATERIAL FEEDING APPARATUS FOR VERTICAL-TYPE BAG FORM-FILL-SEALING MACHINE

(75) Inventors: Tatsuo Inoue, Nagareyama (JP); Naohiko Kakutani, Nagareyama (JP)

(73) Assignee: Tokyo Automatic Machinery Works, Ltd., Tokyo (JP)

( * ) Notice: Subject to any disclaimer, the term of this patent is extended or adjusted under 35 U.S.C. 154(b) by 225 days.

(21) Appl. No.: 09/593,520

(22) Filed: Jun. 14, 2000

(30) Foreign Application Priority Data

Jun. 16, 1999 (JP) .......................................... 11-169696

(51) Int. Cl.[7] .............................................. B65B 57/12
(52) U.S. Cl. ........................................................ 53/74
(58) Field of Search ........................ 53/74, 551, 374.3, 53/389.1; 493/22, 27

(56) References Cited

U.S. PATENT DOCUMENTS 4,262,474 A * 4/1981 Reuter et al. .................. 53/551
5,317,858 A * 6/1994 Hanai ............................ 53/451
5,377,474 A * 1/1995 Kovacs et al. ................. 53/64
5,707,329 A * 1/1998 Pool et al. .................... 493/302
6,233,902 B1 * 5/2001 Nakagawa ..................... 53/55

FOREIGN PATENT DOCUMENTS

JP          B2767925          7/1995

* cited by examiner

*Primary Examiner*—Rinaldi I. Rada
*Assistant Examiner*—John Paradiso
(74) *Attorney, Agent, or Firm*—Birch, Stewart, Kolasch & Birch, LLP

(57) ABSTRACT

A packing material feeding apparatus for a vertical-type bag form-fill-sealing machine comprises a feeding device for feeding a web as a packing material along a filling tube at a constant velocity during a normal operation of the machine, and a controller for controlling the operation of the feeding device. When a filling operation of articles is absent, the controller reduces a web feeding velocity, and then accelerates the web feeding velocity to the constant velocity when filling of the articles is resumed afterward. The acceleration of the web is carried out using a period equal to or longer than a unit packing period which is required to produce one bag during the normal operation of the machine.

11 Claims, 14 Drawing Sheets

PACKING MATERIAL FEEDING APPARATUS FOR VERTICAL-TYPE BAG FORM-FILL-SEALING MACHINE

BACKGROUND OF THE INVENTION

1. Field of the Invention

The present invention relates to an apparatus for feeding a packing material along a filling tube of a vertical-type bag form-fill-sealing machine.

2. Description of the Related Art

A packing material feeding apparatus of the type mentioned above feeds a packing material surrounding the outside of a filling tube along the filling tube at a constant velocity during a normal, operation of a vertical-type bag form-fill-sealing machine, where both side edges of the packing material are overlapped in a predetermined form.

While the packing material is being fed, both side edges of the packing material are thermally sealed in sequence to form a center seal on the packing material. This center seal forms the packing material in a completely cylindrical shape.

Then, the cylindrical packing material is again thermally sealed every predetermined feeding length to form a top seal on the packing material. Immediately after the formation of the top seal, the packing material is cut from the center of the top seal. As a result, bags each having a predetermined length are periodically formed from the packing material.

On the other hand, a measuring device of the machine periodically fills articles into the packing material through the filling tube. The filling of articles is performed alternately with the formation of the top seal. As a result, bags periodically formed from the packing material can individually receive the supplied articles and hence accommodate the articles therein.

As will be understood from the foregoing, it should be ensured that the articles are filled in the packing material within a period required to form one bag, i.e., within a unit packing period. However, the operation involved in filling the articles from the measuring device is susceptible to temporary instability due to certain states of the articles accumulated in the measuring device, more specifically, due to an increased and decreased amount of accumulated articles, partial accumulation, and so on, resulting in a situation where the articles are not filled in a bag within the unit packing period, i.e., "non-filling" of articles.

If the packing material was continuously fed and formed with a top seal and cut in association with the feeding during such article non-filling state, the machine would produce empty bags which accommodate no articles. To avoid producing such empty bags, the operation of the machine must be shut down, that is, the packing material must be prevented from being fed immediately at the time the "non-filling" of articles occurs. Such shut-down would result in a significant reduction in productivity.

An example of a packing machine intended to eliminate the foregoing defect is disclosed, for example, in Japanese Patent Publication No. Hei 7-67925. In this known packing machine, when the "non-filling" of articles occurs, the packing material is fed at a lower velocity. Subsequently, as the packing machine resumes filling articles, the lower velocity in feeding the packing material is immediately released to increase the packing material feeding velocity to a normal velocity, followed by a normal operation of the packing machine. In this way, the packing material feeding control as described above reduces the number of times the packing machine is shut down.

In regard to an article filling operation which should be performed in periodic basis, assuming now a situation in which the "non-filling" of articles occurs only once, the feeding of the packing material is shifted from a reduced velocity state to a normal velocity state within a unit packing period, resulting in inevitable sudden acceleration for feeding the packing material. Such sudden acceleration may cause instability in feeding the packing material. The instable feeding would result in a difference between the length of fed packing material required to produce one bag and the length of actually fed packing material, leading to a degraded quality of resulting bags and the production of defective bags.

SUMMARY OF THE INVENTION

It is therefore an object of the present invention to provide a packing material feeding apparatus for a vertical-type bag form-fill-sealing machine which is capable of stably feeding a packing material, even in a situation where the "non-filling" of articles occurs, to accurately maintain the length of produced bags at a required length.

The above object is achieved by the present invention which provides a packing material feeding apparatus for a bag form-fill-sealing apparatus, which comprises a feeding device for feeding a packing material; and a controller for controlling a packing material feeding velocity through the feeding device, the controller including a deceleration state for decelerating the packing material feeding velocity from a constant velocity when articles are not filled during a normal operation of the bag form-fill-sealing apparatus; and an acceleration state for increasing the packing material feeding velocity to the constant velocity when filling of the articles is resumed after starting the deceleration state, wherein the acceleration state is executed using a period equal to or longer than the unit packing period.

According to the feeding apparatus described above, since the acceleration state of the packing material is executed over a unit packing period or longer, the acceleration is smoothly performed. For this reason, the length of the fed packing material is accurately controlled, so that the length dimension of individual produced bags can be maintained at a predefined length to stabilize the quality of the bags.

The deceleration state may include a deceleration interruption mode for temporarily interrupting the deceleration of the packing material to maintain the packing material feeding velocity at a uniform velocity.

Likewise, the acceleration state may include an acceleration interruption mode for temporarily interrupting the acceleration of the packing material, and maintaining the packing material feeding velocity at a uniform velocity.

More specifically, the deceleration state further includes a first and a second deceleration mode executed before and after the deceleration interruption mode, while the acceleration state further includes a first and a second deceleration mode executed before and after the acceleration interruption mode.

In this case, since the feeding of the packing material is gradually decelerated in the deceleration state, the packing material is slowly stopped. Likewise, in the acceleration state, since the feeding of the packing material is gradually accelerated, stable acceleration of the packing material is achieved. As a result, the length of the fed packing material can be accurately controlled even in the deceleration state and the acceleration state.

Preferably, the packing material feeding velocity is set equal in the deceleration interruption mode and in the acceleration interruption mode. In this event, if the packing material is being fed in the deceleration state, i.e., in the deceleration interruption mode, due to "no-filling" of articles, the feeding of the packing material can smoothly proceed from the deceleration interruption mode to the acceleration interruption mode of the acceleration state, provided that the filling of the articles is resumed within the next unit packing period.

Such direct transition of the packing material feeding from the deceleration interruption mode to the acceleration interruption mode does not involve stopping the feeding of the packing material, so that the machine can provide a continuous operation, thus reducing the frequency of operations shut-down.

Further, the controller preferably matches the total length of the fed packing material in the deceleration state and the acceleration state with a length required to produce one bag.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirits and scope of the invention will become apparent to those skilled in the art from this detailed description.

BRIEF DESCRIPTION OF THE DRAWINGS

The present invention will be understood better by the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 1:
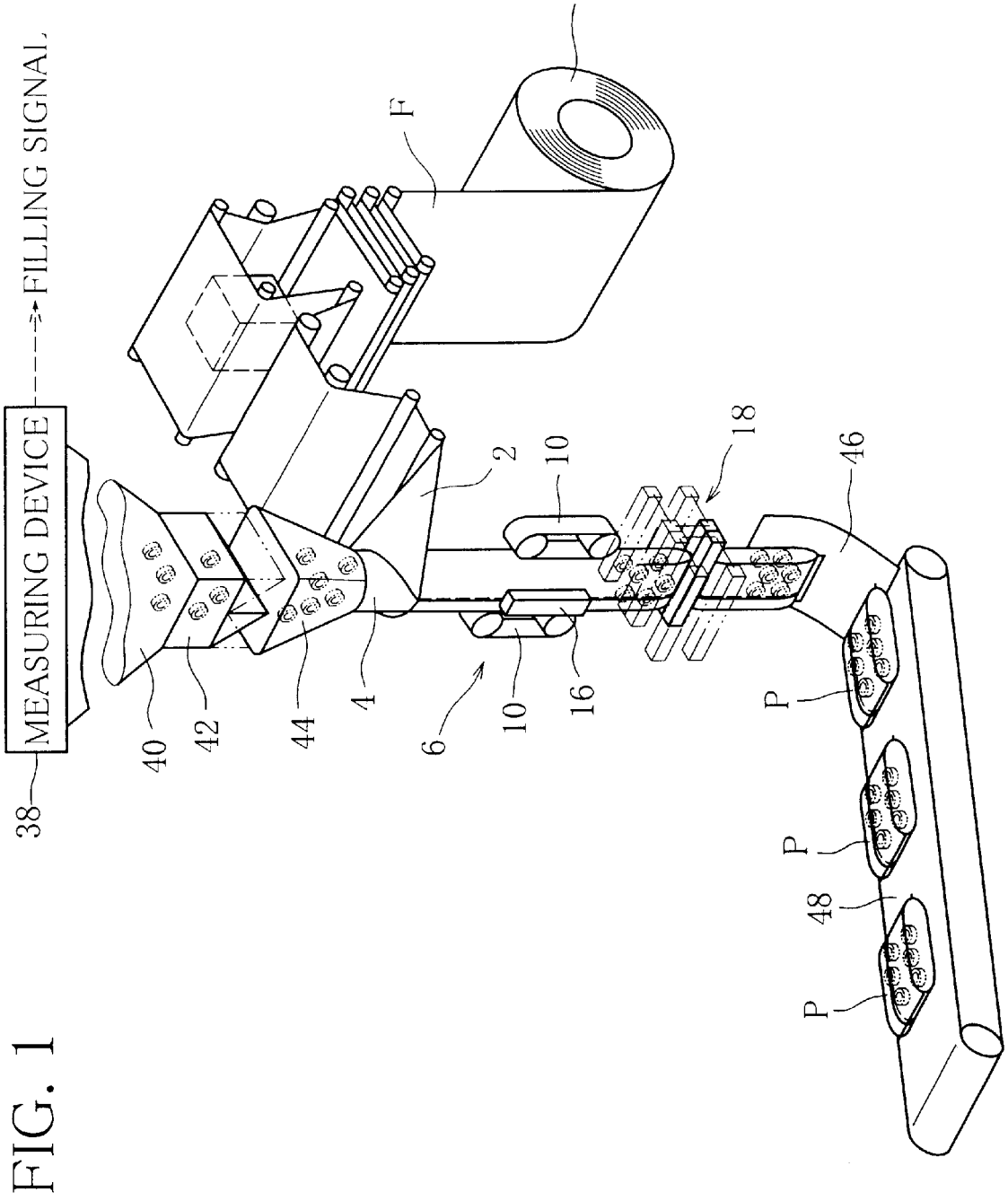
FIG. 1 is a perspective view generally illustrating a vertical-type bag form-fill-sealing machine.

Referring to FIG. 1, a vertical-type bag form-fill-sealing machine comprises a roll R of the packing material. The roll R feeds the packing material such as a thermally weldable film or the like, i.e., a web F. The web F is formed into a cylindrical shape by a former 2. The cylindrical web F surrounds a filling tube 4, and extends downwardly along the filling tube 4. In addition, the cylindrical web F has two side edges overlapped in a predetermined form.

Figure 2:
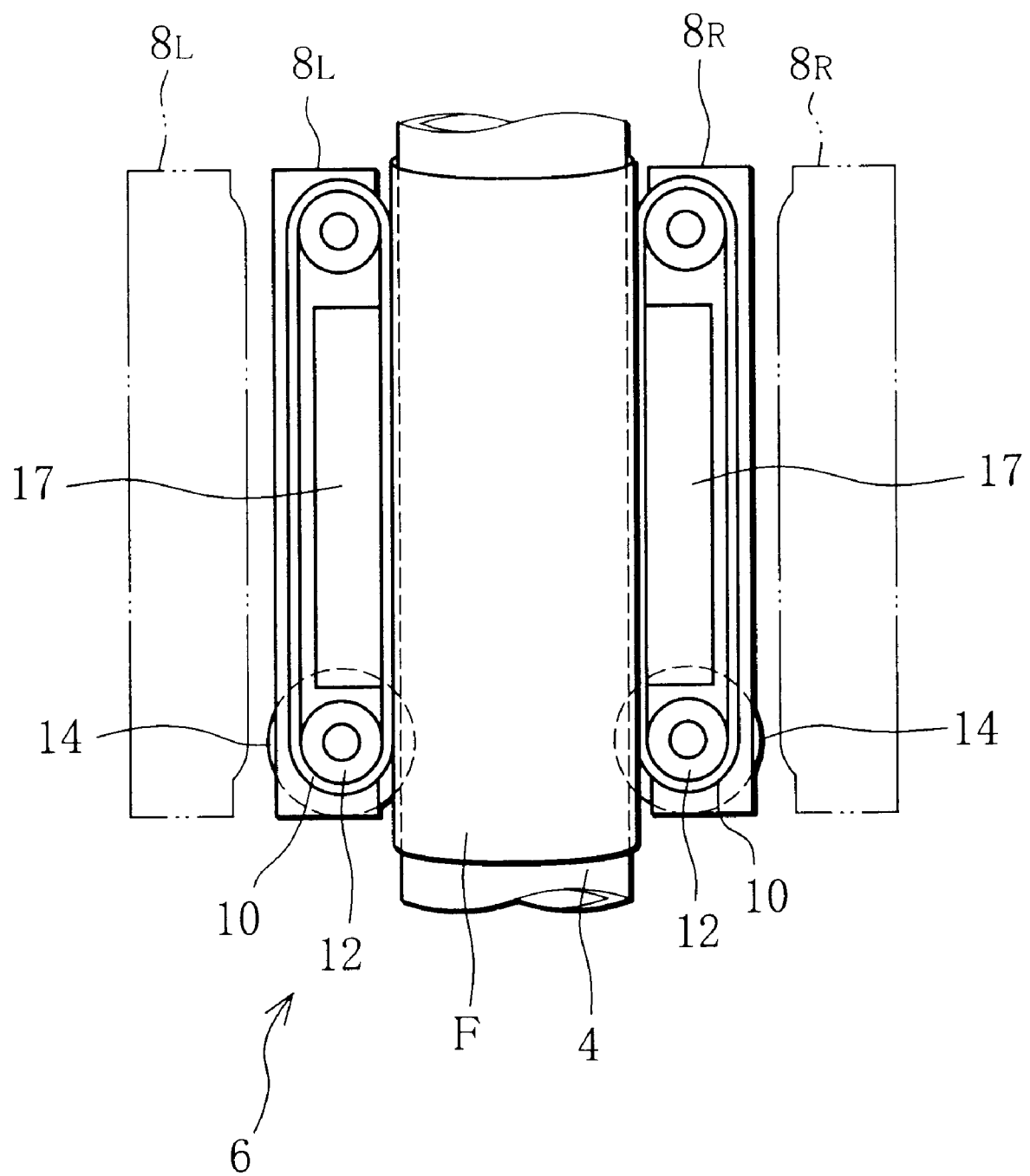
FIG. 2 is a diagram illustrating a web feeding device in FIG. 1 in enlarged view.

The machine comprises a feeding device 6 for feeding the web F, which is illustrated in FIG. 2 in enlarged view. The feeding device 6 has a pair of feeding units $8_L$, $8_R$ which are disposed on both sides of the filling tube 4.

Each of the feeding units $8_L$, $8_R$ has an endless feeding belt 10 which extends between upper and lower rollers. The lower roller 12 is connected to a servomotor 14 which rotates the roller 12, causing the feeding belt 10 to run in one direction.

Each of the feeding units $8_L$, $8_R$ has a running guide 17 for the feeding belt 10. The running guide 17 defines a suction chamber (not shown) in its interior, and the suction chamber supplies the feeding belt 10 with a suction force. Thus, when each of the feeding units $8_L$, $8_R$ is at an advanced position indicated by solid lines in FIG. 2, the running feeding belt 10 sucks the web F with the suction force, and feeds the web F downwardly along the filling tube 4. The left and right feeding units $8_L$, $8_R$ are movable in association with each other between the advanced position close to the filling tube 4 and a retracted position away from the filling tube 4. When the feeding units 8 are at the respective retracted positions indicated by two-dot chain lines in FIG. 2. a predetermined gap is ensured between the feeding belt 10 and the filling tube 4.

As illustrated in FIG. 1, the machine further comprises a center sealer 16 between the left and right feeding units $8_L$, $8_R$. The center sealer 16 is also movable between an advanced position close to the filling tube 4 and a retracted position away from the filling tube 4. The center sealer 16 includes a-heater block (not shown). When the center sealer is located in the advanced position, both side edges of the web F are sandwiched between the heater block and the filling tube 4, and heated by the heat received from the heater block. In this way, as the web F passes through the center sealer 16, both side edges are thermally sealed to continuously form a center seal on the web F. Such a center seal forms the web F into a completely cylindrical shape.

The machine further comprises a top sealer 18 which is disposed below the filling tube 2. The top sealer 18 forms a top seal on the web F, and cuts the web F from the center of the formed top seal.

Figure 3:
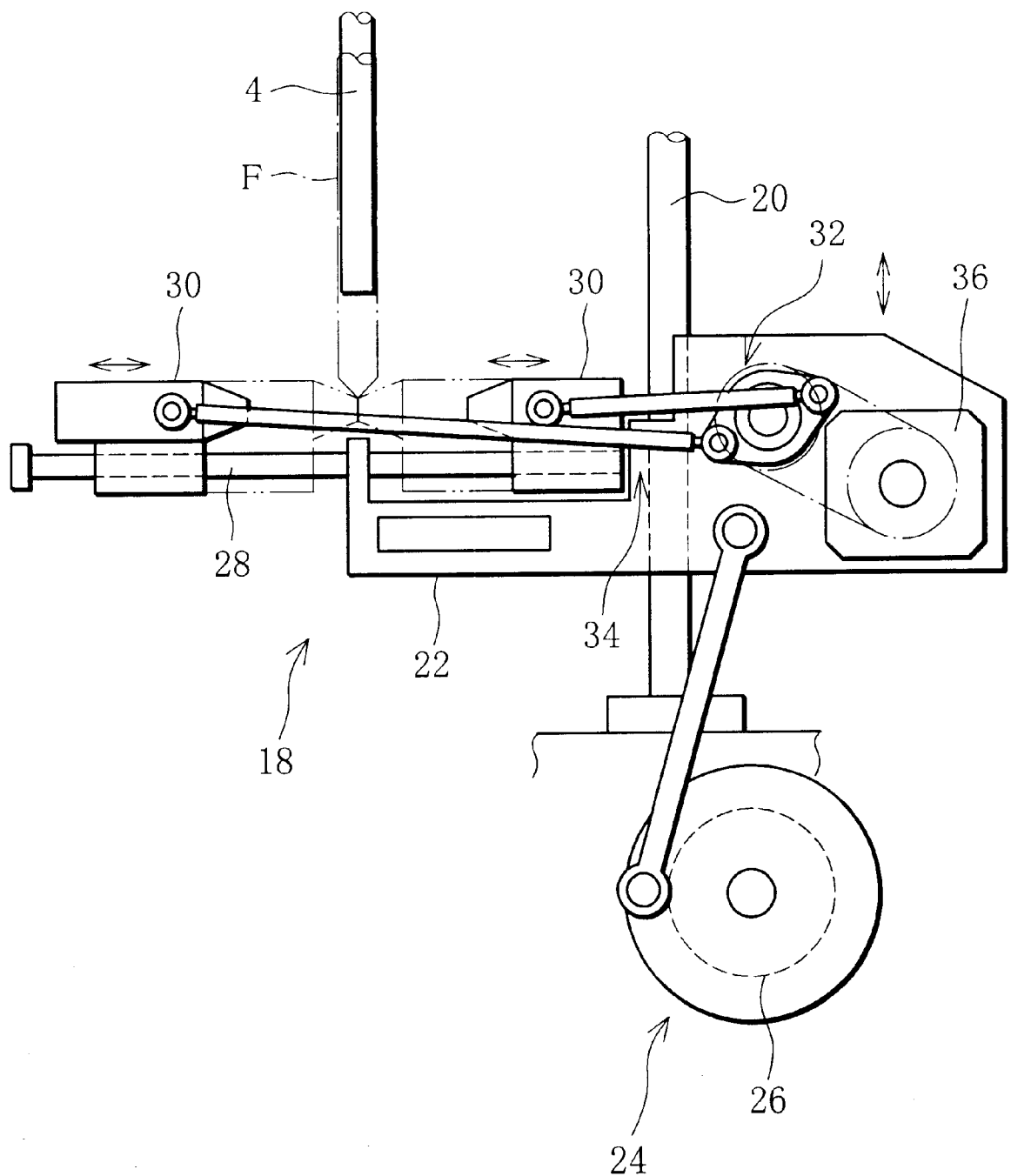
FIG. 3 is a schematic diagram illustrating a top sealer in FIG. 1.

FIG. 3 more specifically illustrates the top sealer 18. The top sealer 18 comprises an elevator 22 which can move vertically along right and left guide posts 20. For realizing such movements of the elevator 22, the top sealer 18 includes a crank mechanism 24 and a servomotor 26.

The elevator 22 has two guide rods 28 which extend horizontally. The guide rods 28 support a pair of heater blocks 30 which are slidable on the guide rods 28. The heater blocks 30 are disposed below the filling tube 4 with a feeding path of the web F interposed therebetween. The pair of heater blocks 30 are connected to crank mechanisms 32, 34, individually, and the crank mechanisms are operated by a common servomotor 36. As the servomotor 36 is rotated, the crank mechanisms 32, 34 reciprocate the associated heater blocks 30 on the guide rods 28 in the horizontal direction. As a result, the pair of heater blocks 30, associated with each other, advance toward the feeding path of the web F and move away from the feeding path.

Also, one of the heater blocks 30 incorporates a movable blade (not shown) which can protrude from the heater block 30. Correspondingly, the other heater block 30 has a recess (not shown):which can accept the movable blade.

Figure 4:
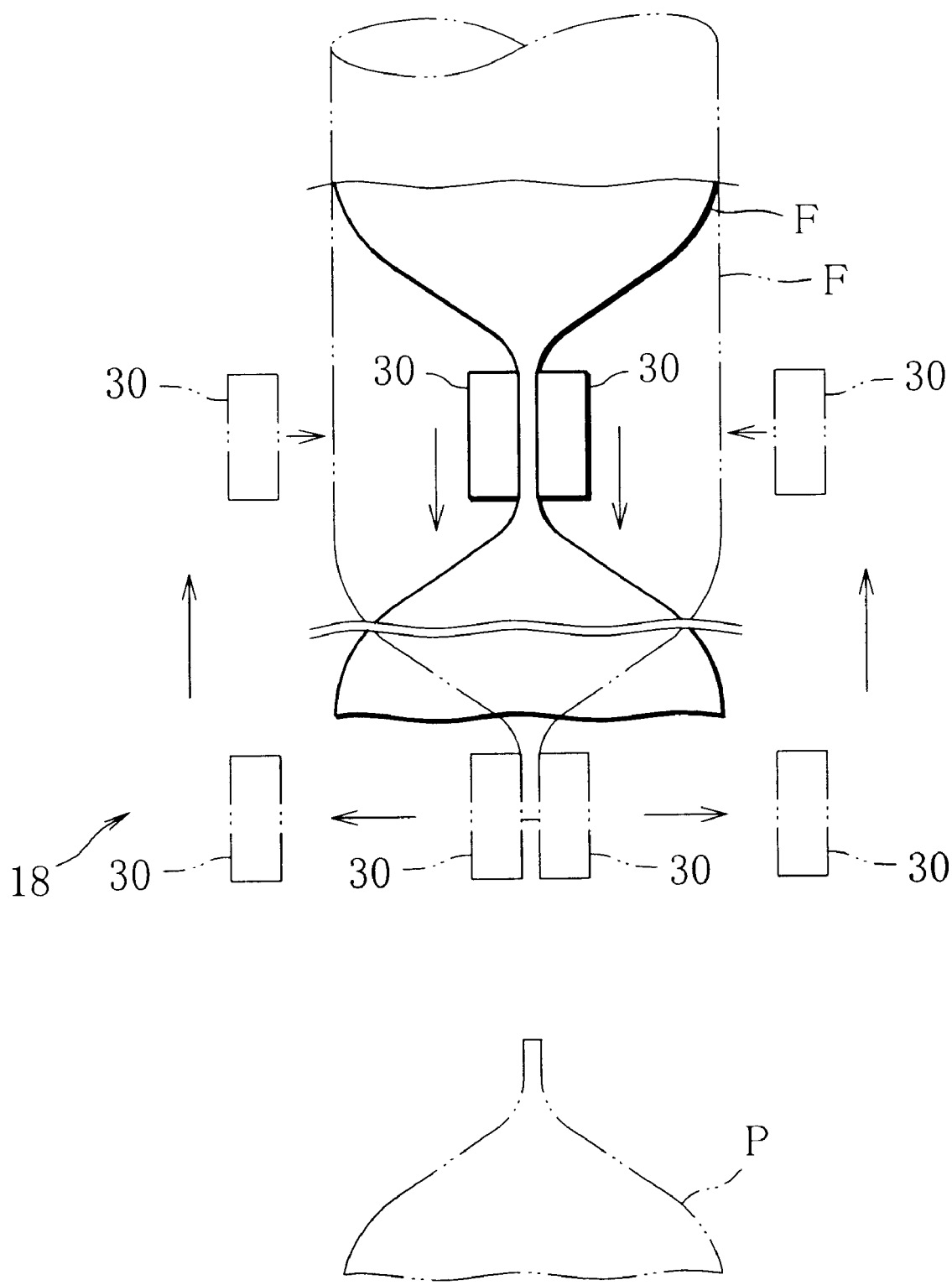
FIG. 4 is a diagram for explaining the operation of the top sealer.

As will be apparent from the foregoing description, the pair of heater blocks 30 vertically reciprocate together with the elevator 22, and reciprocate with respect to each other in thee horizontal direction. These reciprocating movements are controlled by the servomotors 26, 36. FIG. 4 illustrates how the heater blocks 30 are reciprocated in the vertical direction and in the horizontal direction.

Assuming now that the pair of heater blocks 30 are in a state shown by solid lines in FIG. 4, the heater blocks 30 sandwich the web F therebetween. In the state as shown in FIG. 4, the web F is thermally sealed by heat received from the heater blocks 30, resulting in a top seal formed on the web F. Subsequently, the web F is cut by the movable blade of the one heater block 30 at the center of the top seal. In this way, the top sealer 18 periodically forms bags P from the web F, and discharges the formed bags P.

The web F, on the other hand, can receive articles supplied through the filling tube 4 and be filled with the articles. The filling of the articles in the web F is performed alternately with the foregoing formation of the top seal. As a result, each of the bags P discharged from the top sealer 18 accommodates the articles.

For filling the articles in the web F, the machine comprises a measuring device 38, as illustrated in FIG. 1, which is connected to the top end of the filling tube 4 through an upper hopper 40, a shutter 40 and a lower hopper 44. As the articles are delivered from the measuring device 38 toward the filling tube 4, the measuring device 38 outputs an article filling signal.

A bag P discharged from the top sealer 18, as illustrated in FIG. 1, is received by a belt conveyer 48 through a chute 46. The belt conveyer 48 conveys the received bag P to a box packaging machine (not shown).

Figure 5:
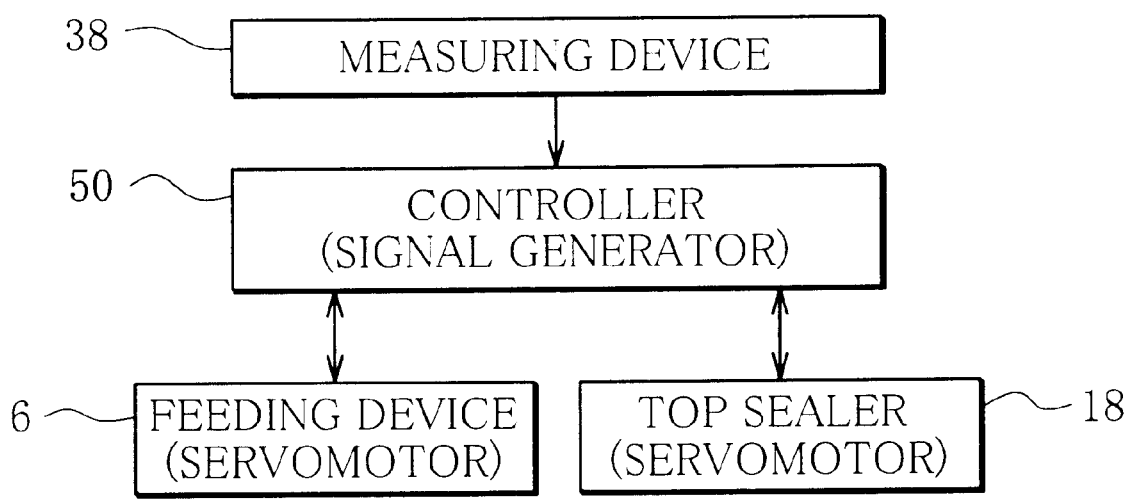
FIG. 5 is a block diagram for explaining how to control the operation of the feeding device.

As illustrated in FIG. 5, the aforementioned servomotor 14 of the feeding device 6 as well as the servo motors 26, 36 of the top sealer 18 are electrically connected to a controller 50. The controller 50 is also electrically connected to the measuring device 38, so that the controller 50 can receive the filling signal output from the measuring device 38.

The controller 50 includes a microprocessor, a storage device such as ROM, RAM or the like, an input/output interface, and a timing signal generator. The controller 50 controls the operation of the feeding device 6 and the top sealer 18, respectively, based on whether or not the filling signal is output from the measuring device 38.

Figure 6:
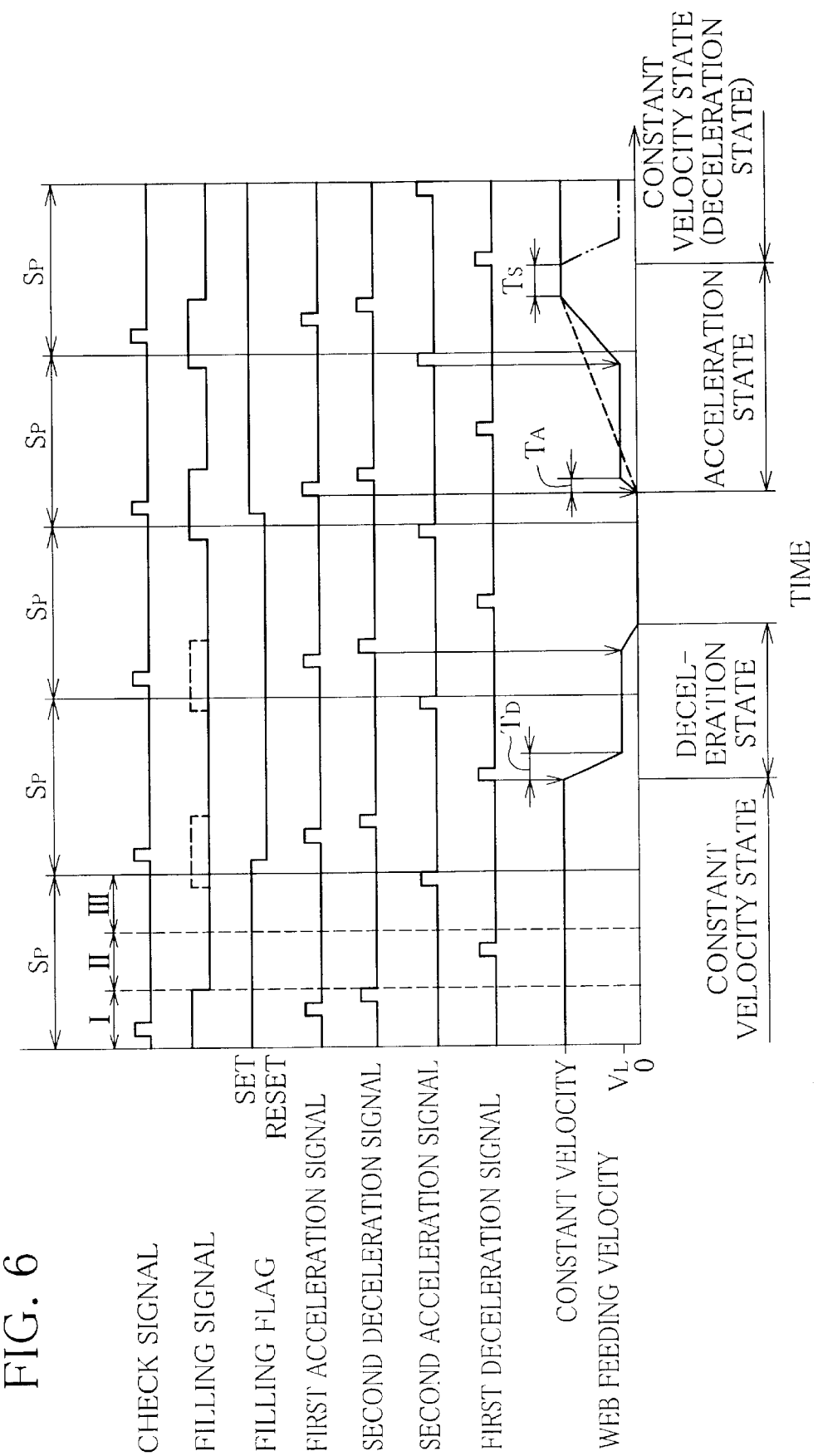
FIG. 6 is a timing chart for explaining functions of a controller in FIG. 5.

The timing signal generator of the controller 50 periodically generates a check signal as shown in FIG. 6. The period at which the check signal is generated is coincident with the period at which the filling signal is output from the measuring device 38 when the machine is normally operating and the article filling operation from the measuring device 38 is being normally repeated. More specifically, the check signal generating period is coincident with a unit packing period $S_P$ required to produce one bag during a normal operation of the machine.

The timing signal generator further generates first and second acceleration signals and first and second deceleration signals in addition to the check signal during the unit packing period $S_P$. As shown in FIG. 6, the unit packing period $S_P$ is divided into an initial subperiod I, an intermediate subperiod II and a later subperiod III. Assuming that the check signal is generated in the initial subperiod I, the first acceleration signal is generated in the initial subperiod (I) subsequent to the check signal. The second deceleration signal is generated at the end of the initial subperiod (I) after the generation of the first acceleration signal. The second acceleration signal is generated at the end of the later subperiod (III), while the first deceleration signal is generated in the middle of the intermediate subperiod (II).

When the machine is in a normal operating state, the feeding device 6 is feeding the web F at a constant velocity, and the measuring device 38 is regularly filling articles at the period coincident with the unit packing period $S_P$ and, is periodically outputting the filling signal in response to the article filling operation. On the other hand, during the normal operation of the machine, the pair of heater blocks 30 in the top sealer 18 are reciprocally moving in the vertical direction and in the horizontal direction, respectively, at the timing in accordance with a web feeding velocity.

Figure 7:
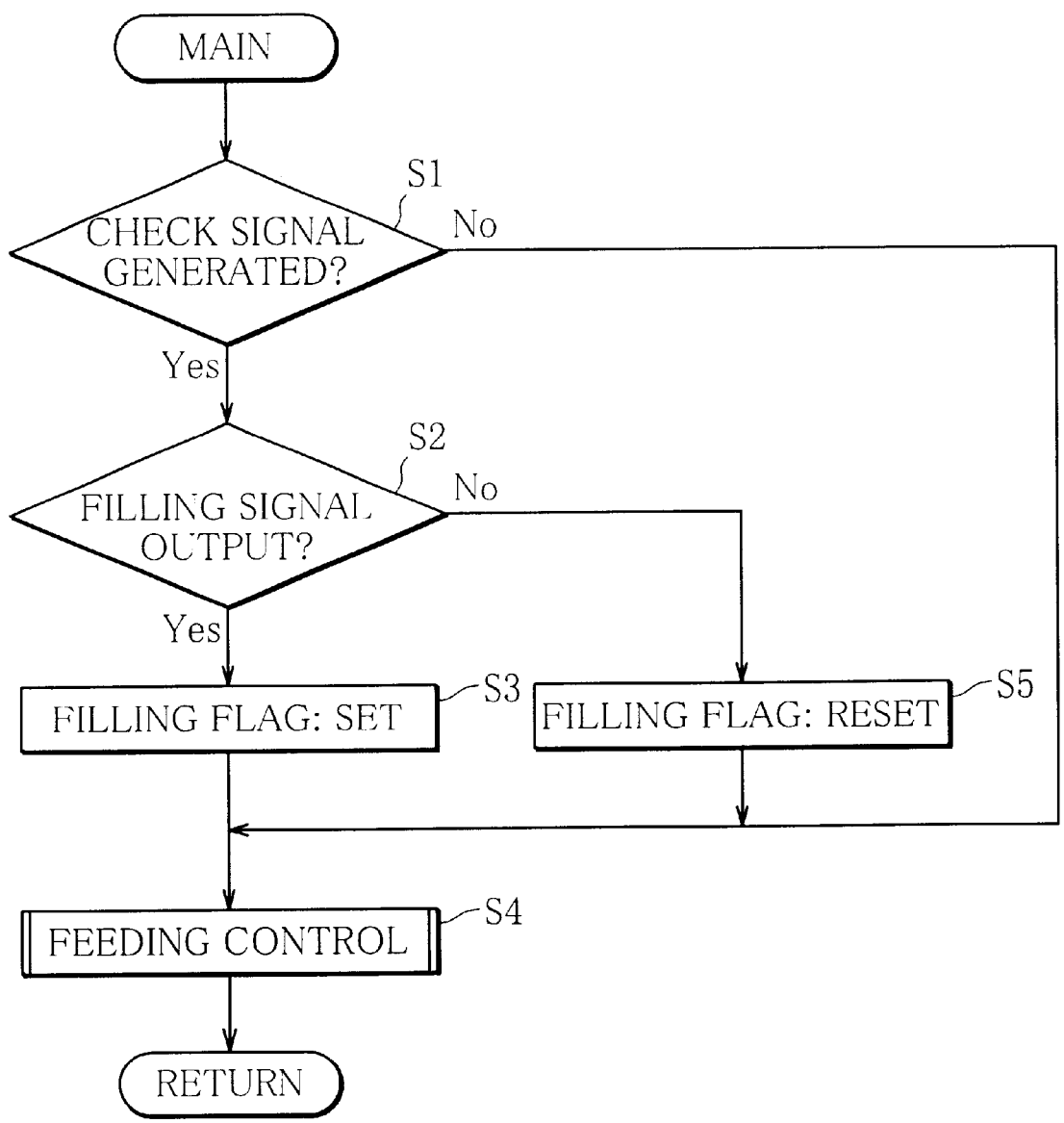
FIG. 7 is a flow chart illustrating a main routine executed by the controller in FIG. 5.

During a normal operation of the machine, the controller 50 executes a main routine illustrated in FIG. 7. First, in the main routine, the controller 50 determines whether or not the check signal is generated (step S1). If the determination result is true (Yes), the controller 50 determines whether or not the filling signal is output (step S2). If the determination result at step S2 is again true (Yes), a filling flag is set (step S3), followed by the controller 50 executing a feeding control routine (step S4).

Conversely, if the determination result at step S2 is false (No), the filling flag is reset (step S5), followed by the controller executing the feeding control routine (step S4). Further, when the determination result at step S1 is false, the controller 50 directly executes the feeding control routine (step S4) without executing any of steps S2, S3, S5.

During the normal operation of the machine, the filling flag is always maintained to be set. However, the filling flag is rest if the measuring device 38 does not output the filling signal due to a failure in filling the articles into the filling tube 4 at the time the check signal is generated, i.e., if "no-filling" of articles occurs (see FIG. 6).

Next, the feeding control routine (step S4) will be described below in detail with reference to FIGS. 8 to 16.

Figure 8:
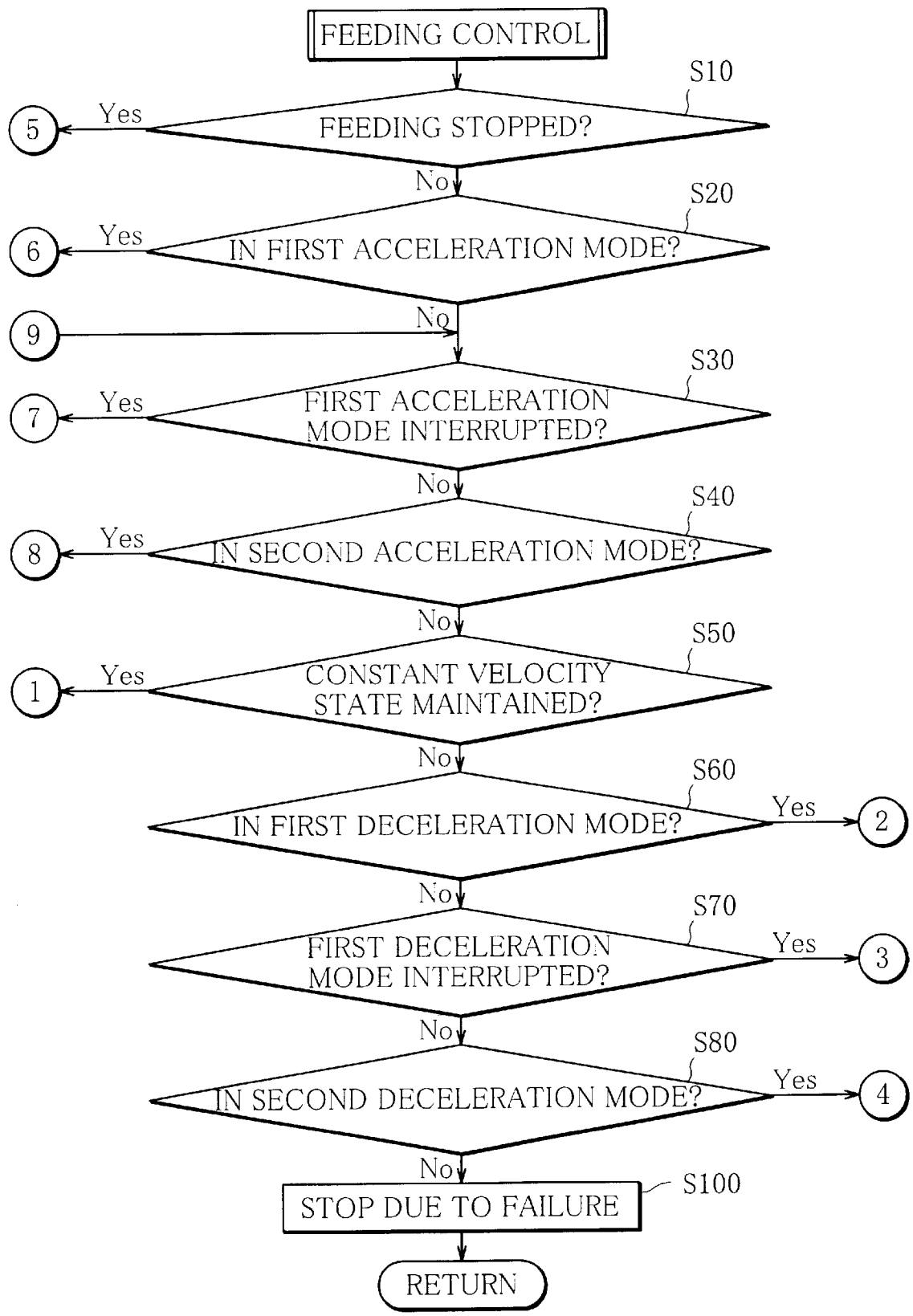
FIGS. 8 to 16 are flow charts illustrating the feeding control routine of FIG. 7 in detail.

First, as illustrated in FIG. 8, the controller 50 sequentially determines:

a) whether or not the feeding of the web F is stopped (step S10);

b) whether or not the feeding of the web F is in a first acceleration mode (step S20);

c) whether or not the first acceleration mode of the web F is interrupted (step S30);

d) whether or not the feeding of the web F is in a second acceleration mode (step S40);

e) whether or not the feeding of the web F is maintained in a constant velocity state (step S50);

f) whether or not the feeding of the web F is in a first deceleration mode (step S60);

g) whether or not the first deceleration mode of the web F is interrupted (step S70); and h) whether or not the feeding of the web F is in a second deceleration mode (step S80).

When the results of these determinations are all false, the controller 50 determines that the feeding device 50 has failed, and stops the operation of the feeding device 6 (step S100).

Figure 9:
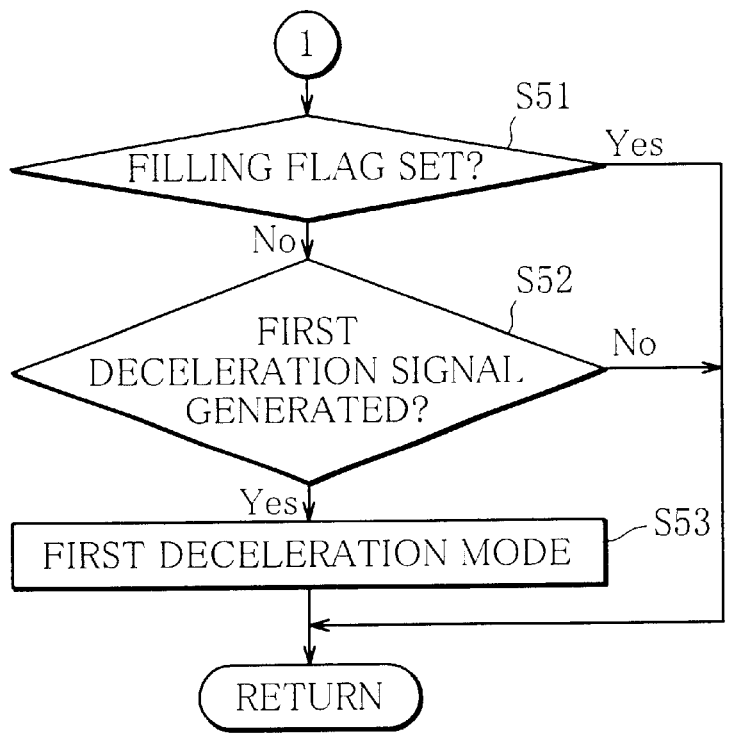

Assuming now that the machine is in the normal operating state to keep feeding the web F at the constant velocity state, the result of. the determination at step S50 is true, causing the controller 50 to execute a flow illustrated in FIG. 9 from step S50.

In the flow of FIG. 9, the controller 50 first determines whether or not the filling flag is set (step S51). If the determination result at step S51 is true, the execution of the controller 50 returns to the main routine of FIG. 7. Thus, in during the normal operation of the machine, the controller 50 repeatedly executes only steps S50, S51 in the feeding control routine.

During the normal operation of the machine, the length of the web F fed in the unit packing period $S_P$ is coincident with the predefined length dimension of one bag to be produced. Here, the length of the fed web F is expressed by the product of the unit packing period $S_P$ and the velocity at which the web F is fed.

On the other hand, during the normal operation of the machine, if the determination result at step S51 becomes false, i.e., if the filling flag is reset due to the absence of filled articles, the controller 50 determines whether or not the first deceleration signal is generated (step S52). Subsequently, if the determination result at step S52 is true, the controller 50 controls the operation of the feeding device 6 to feed the web F in the first deceleration mode, switched from the constant velocity state (step S53). In the first deceleration mode, the velocity at which the web F is fed is gradually reduced from the constant velocity at a predetermined first deceleration rate. As a result, the feeding of the web F proceeds from the constant velocity state to a deceleration state, as shown in FIG. 6.

Figure 10:
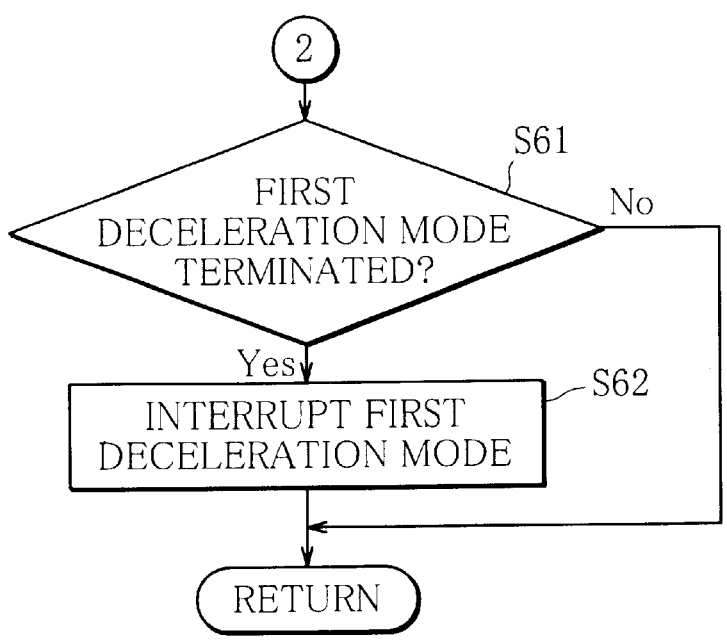

When the feeding of the web F is in the first deceleration mode, the determination result at step S60 in the flow of FIG. 8 is true, causing the controller 50 to execute a flow illustrated in FIG. 10 from step S60.

In the flow of FIG. 10, the controller 50 first determines whether or not the first deceleration mode has been terminated (step S61). Specifically, at step S61, the controller 50 determines whether or not a predetermined time $T_D$ has elapsed from the beginning of the first deceleration mode. When the determination result at step S61 is true, the first deceleration mode is interrupted at this time. Afterward, the velocity at which the web F is fed is maintained at a velocity $V_L$ at the time the first deceleration mode is interrupted, as shown in FIG. 6. Here, the velocity $V_L$ is set approximately ⅕ to ⅔ of the constant velocity (see FIG. 6).

Figure 11:
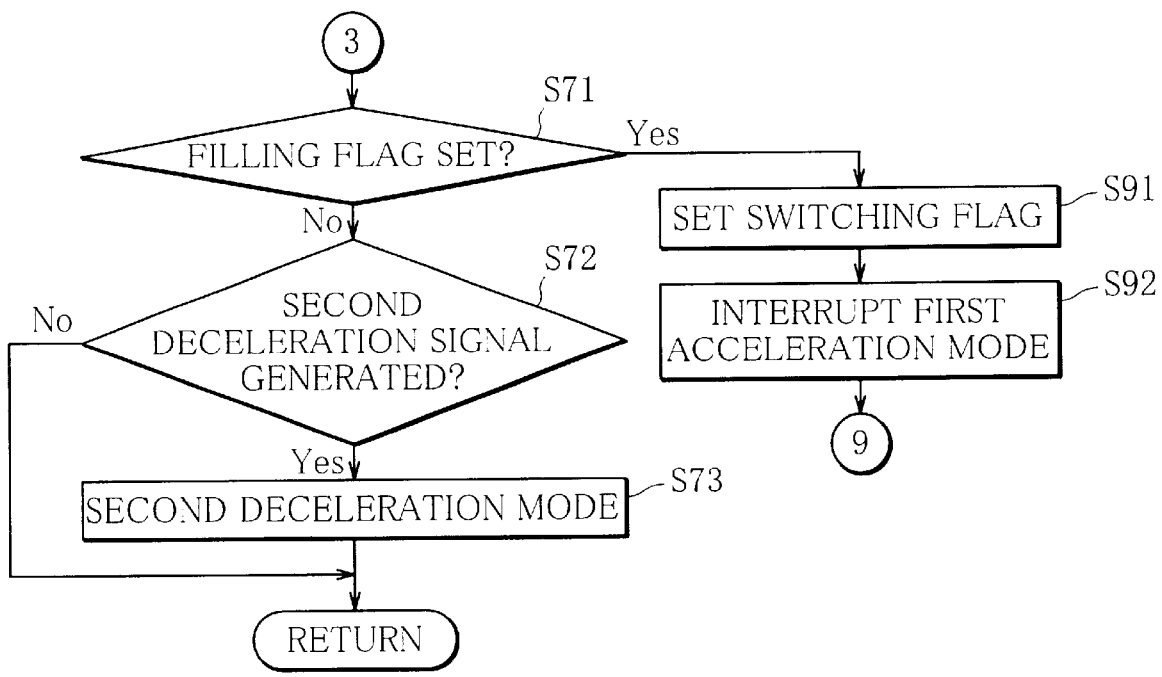

As the first deceleration mode is interrupted as described above, the determination result at step S70 becomes true in the flow of FIG. 8 in consequence. Thus, the controller 50 executes a flow illustrated in FIG. 11 from step S70. In the flow of FIG. 11, the controller 50 first determines whether or not the filling flag is set (step S71). If the determination at step 71 results in false, this shows a situation where "no-filling" of articles is continuing, as indicated by a broken line in FIG. 6. In this event, the controller 50 determines whether or not the second deceleration signal is generated (step S72).

When the determination result at step S72 is true, the web F is fed in a second deceleration mode, shifted from the previous state in which the web F is fed at velocity $V_L$ (step S73). Here, in the second deceleration mode, the velocity at which the web F is fed is reduced to a second deceleration rate which is smaller than the first deceleration rate.

As the feeding of the web F proceeds to the second deceleration mode, the determination result at S80 becomes true. In this event, the controller 50 responsively executes a flow illustrated in FIG. 12 from step S80.

Figure 12:
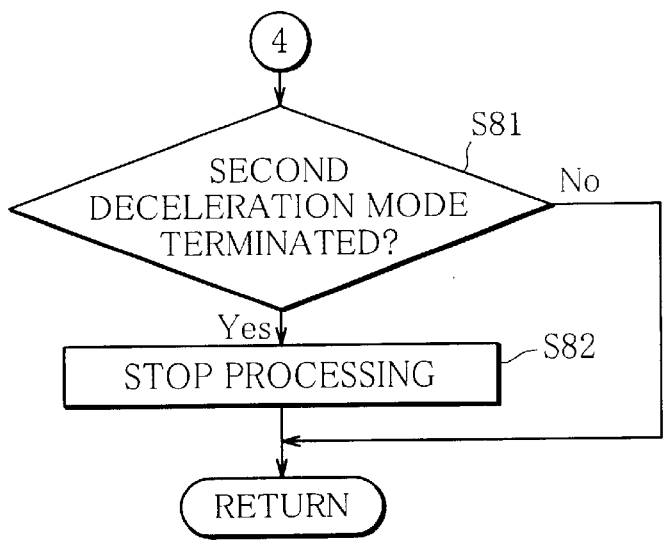

In the flow of FIG. 12, the controller 50 determines whether or not the second deceleration mode has been terminated (step S81). Specifically, the controller 50 determines at step S81 whether or not the velocity at which the web F is fed is equal to zero. If the determination result at step S81 is true, the controller executes the processing for stopping the web F (step S82), at which time the deceleration state is terminated (see FIG. 6).

Figure 13:
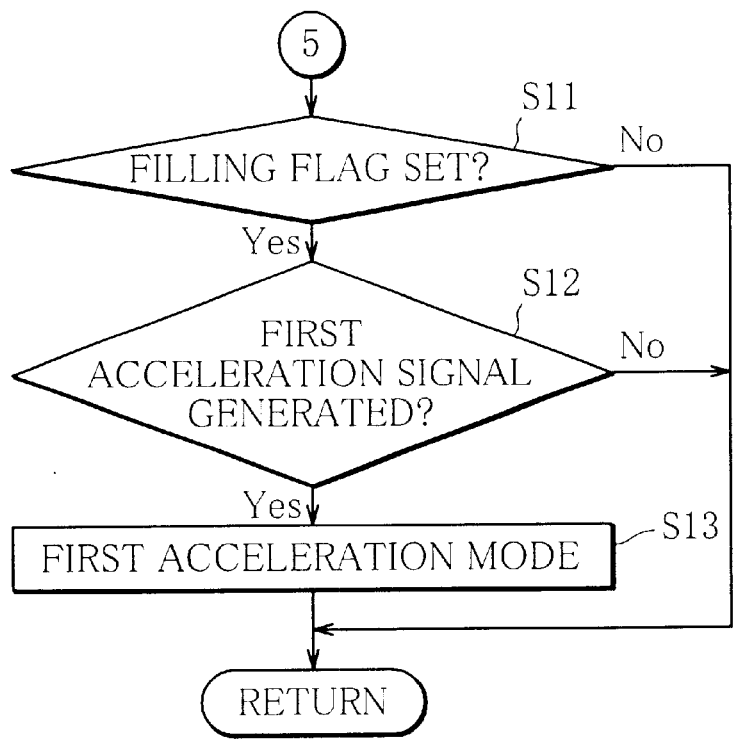

As the feeding of the web F is stopped, the determination result at step S10 becomes true in the flow of FIG. 8. In this event, the controller 50 responsively executes a flow illustrated in FIG. 13 from step S10. In the flow of FIG. 13, the controller 50 first determines whether or not the filling flag is set (step S11). The web F is maintained in a stopped state as long as the determination result at step S11 is maintained false.

However, as the measuring device 38 resumes filling the articles to again set the filling flag, the determination result at step S11 becomes true, and the controller 50 next determines whether or not the first acceleration signal is generated (step S12). When the determination result at step S12 is true, the controller 50 executes a first acceleration mode for the web F (step S13). Specifically, when the first acceleration signal is generated after the filling flag was switched from reset to set, the web F is fed in the first acceleration mode. In this first acceleration mode, the web F is fed at a first acceleration rate from the stopped state. As a result, the web F is changed to an acceleration state as shown in FIG. 6.

As the first acceleration mode of the web F is started, the determination result at step S20 becomes true in the flow of FIG. 8. In this event, the controller 50 responsively executes a flow illustrated in FIG. 14 from step S20.

Figure 14:
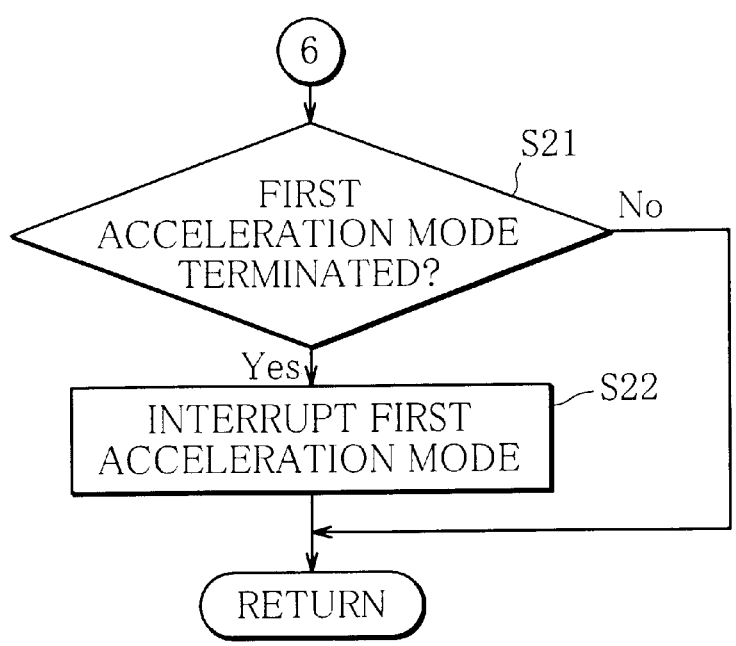

In the flow of FIG. 14, the controller 50 first determines whether or not the first acceleration mode has been terminated (step S21). Specifically, the controller 50 determines whether or not a predetermined time $T_A$ (see FIG. 6) has elapsed from the beginning of the first acceleration mode.

Here, the aforementioned first acceleration rate is set such that the velocity. of the fed web F reaches the aforementioned velocity $V_L$ at the time the predetermined time $T_A$ has elapsed from the beginning of the first acceleration mode.

When the determination result at step S21 is true, the controller 50 interrupts the first acceleration mode (step S22). Afterward, the velocity at which the web F is fed is maintained at the velocity $V_L$.

As the first acceleration mode of the web F is interrupted, the determination result at step S30 becomes true in the flow of FIG. 8. In this event, the controller 50 responsively executes a flow illustrated in FIG. 15 from step S30.

Figure 15:
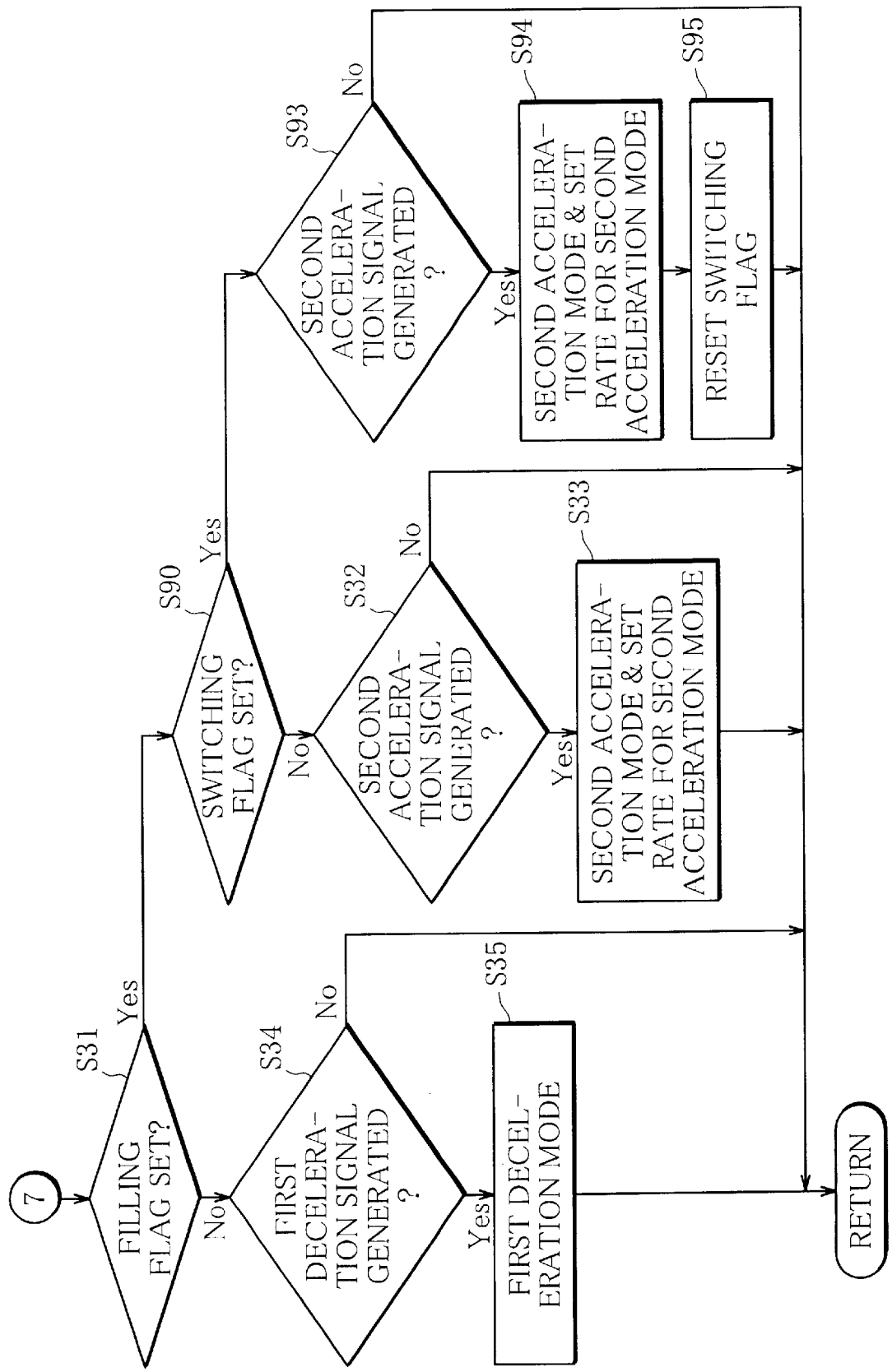

In the flow of FIG. 15, the controller 50 first determines whether or not the filling flag is set (step S31). In this event, if the flow of FIG. 15 is executed from step S30 for the first time, the determination result at step S31 is always true (see FIG. 6). Therefore, in this event, the controller 50 determines whether or not a switching flag, described later, is set (step S90). Since the switching flag is not yet set at this time, the determination result at step S90 is false, causing the controller 50 to determine whether or not the second acceleration signal is generated (step S32). When the determination result at step S32 is true, the controller 50 executes the second acceleration mode for the web F (step S33). In the second acceleration mode, the web F is accelerated at a predetermined second acceleration rate. Here, the second acceleration rate has the absolute value smaller than that of the first deceleration rate.

When the web F is fed in the second acceleration mode, the determination result at step S40 becomes true in the flow of FIG. 8. In this event, the controller 50 executes a flow illustrated in FIG. 16 from step S40.

Figure 16:
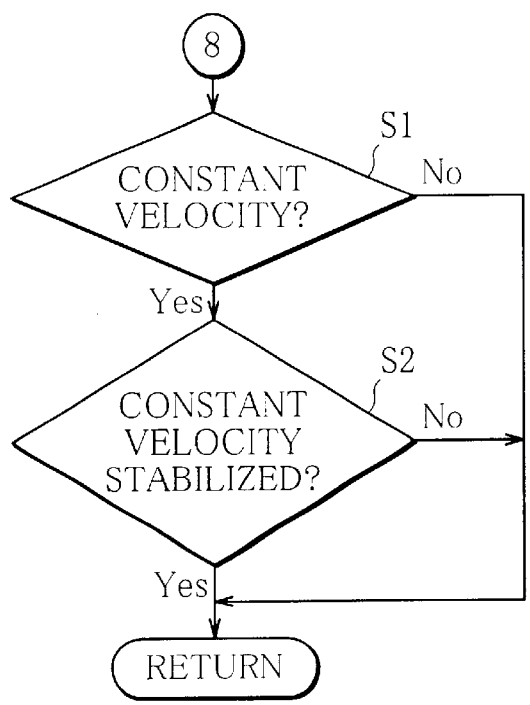

In the flow of FIG. 16, the controller 50 first determines whether or not the velocity at which the web F is fed has reached the constant velocity (step S81). When the determination result at this step is true, the controller 50 again determines whether or not the web F is being stably fed at the constant velocity (step S82). Specifically, the controller 50 determines at step S82 whether or not a predetermined time TS has elapsed after the velocity of the fed web F had reached the constant velocity. Here, the predetermined time $T_S$ corresponds to a minimum time required to stabilize the feeding of the web F in the constant velocity state after the velocity of the fed web F has reached the constant velocity (see FIG. 6). More specifically, as will be apparent from FIG. 6, the predetermined time $T_S$ is set to a time period from the time the velocity of the fed web F reaches the constant velocity to the time the first deceleration signal is generated, and may be, for example, approximately ⅙ of the unit packing period $S_P$.

When the determination state at step S82 is true, the acceleration state of the web F is terminated, causing the web F to proceed to the constant velocity state. For example, at the end of the acceleration state, the web F is subjected to the aforementioned top sealing and cutting, and subsequently the machine returns to the normal operation state.

It should be noted that the top sealing and cutting of the web F may be performed when the web F is in a state other than the normal feeding state, for example, when the web F is in the first deceleration mode. In this case, the velocity at which the top sealer 18 is driven downward is controlled in accordance with the deceleration of the web F.

The aforementioned first deceleration rate and second acceleration rate are set such that the total length of the web F fed during the deceleration state and during the acceleration state, respectively, is coincident with the length of one bag P.

As will be apparent from FIG. 6, the acceleration state of the web F is defined between the time the first acceleration signal is generated and the time the stable constant velocity feeding of the web F is completed, and the period of the acceleration state is equal to, or longer than the unit packing period $S_P$.

When the web F is fed in the second acceleration mode of the acceleration state, the web F has already been fed in the deceleration state and the first acceleration mode (at the velocity $V_L$), respectively. Therefore, for producing one bag P, the length of the fed web F required in the second acceleration mode is short, so that the. second acceleration rate required to accelerate the velocity of the fed web F to the constant velocity can be limited to a small value in the second acceleration mode. For this reason, the web F can be smoothly and stably fed in the second acceleration mode, and moreover, the aforementioned predetermined time $T_S$ is significantly reduced. As a result, even if the web F is fed in the aforementioned deceleration state and acceleration state, the length of the fed web F is highly accurately controlled to maintain the length of produced bags P at the predefined length, thus improving the quality of the bags P.

Figure 17:
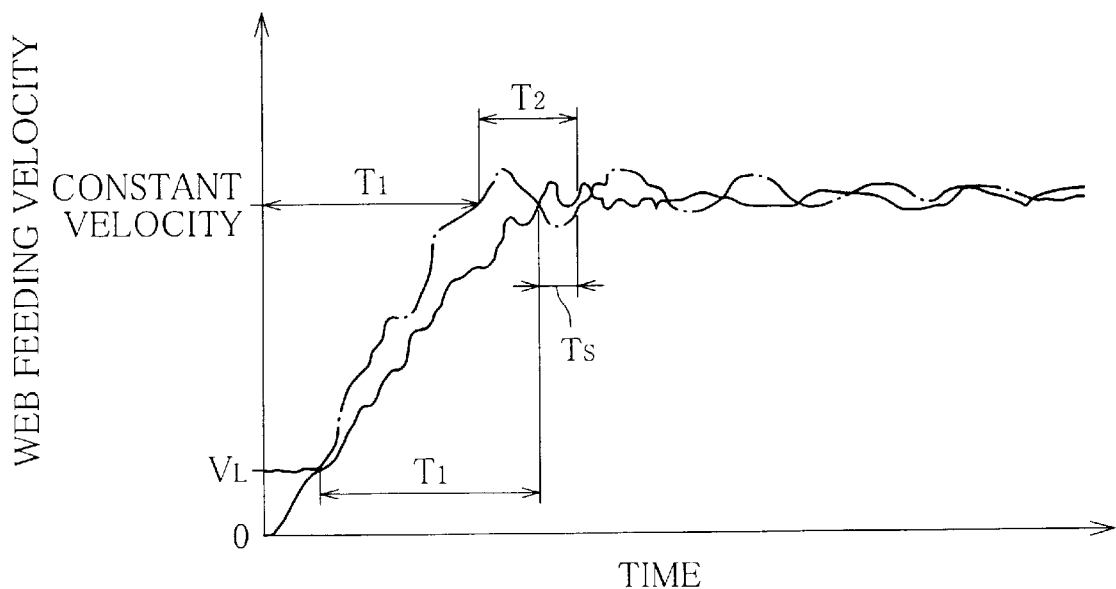
FIG. 17 is a graph related to a web feeding velocity, showing the influence of acceleration in feeding a web.

Referring now to FIG. 17, a solid curve indicates the web F fed in the second acceleration mode, and one-dot chain curve indicates the web F which is fed in the same period $T_1$ as the second acceleration mode when the feeding is accelerated from the stopped state to the constant velocity. As is apparent from FIG. 17, the feeding of the web F indicated by the one-dot chain line must be accelerated at an acceleration rate larger than the second acceleration rate as compared with the feeding of the web F indicated by the solid line, so that the feeding of the web F indicated by the one-dot chain line has larger ripples than the feeding of the web F indicated by the solid line, and accordingly lacks the stability. In addition, a time $T_2$ required until the feeding of the web F indicated by the one-dot chain line becomes stable in the constant velocity state after the velocity of the fed web F has reached the constant velocity is longer than the aforementioned time $T_S$ for the solid-line case. Therefore, if the web F is fed as indicated by the one-dot chain line, the length of the fed web F cannot be highly accurately controlled, resulting in the length of produced bags P deviated from a predefined length.

On the other hand, during the execution of the aforementioned second acceleration mode, the situation where the determination result at step S31 becomes false in the flow of FIG. 15 indicates that "no-filling" of articles occurs immediately after the measuring device 38 resumes filling the articles. In this event, the controller 50 determines whether or not the first deceleration signal is generated (step S34). If the determination result at step S34 is true, the aforementioned first deceleration mode is executed for the web F (step S35), thus causing the determination result at step S60 to become true in the flow of FIG. 8. Accordingly, the controller 50 repeatedly executes the flow of FIG. 10 and the steps subsequent to this flow, so that the feeding of the web F again proceeds to the aforementioned deceleration state. The velocity at which the web F is fed is indicated by a two-dot chain line in FIG. 6. In this event, the deceleration state is started subsequent to the end of the acceleration state, as is apparent from FIG. 6. Here, even in a situation where "filling" and "no-filling" of the articles are alternating, the feeding of the web F is accelerated once to the constant velocity state, and then decelerated.

On the other hand, if the determination result at step S71 in FIG. 11 becomes true when the web F is being fed at the velocity $V_L$, i.e., when the first deceleration mode is interrupted during the deceleration state, the controller 50 sets the switching flag (step S91), and interrupts the first acceleration mode (step S92). The processing involved in the interruption is similar to the processing at step S22 in FIG. 14.

Here, the situation where the determination result at step S71 in FIG. 11 becomes true indicates that the filling of the articles is immediately resumed after a transition has been made from the constant velocity state to the deceleration state due to the absence of the articles filled into the fed web F.

Figure 18:
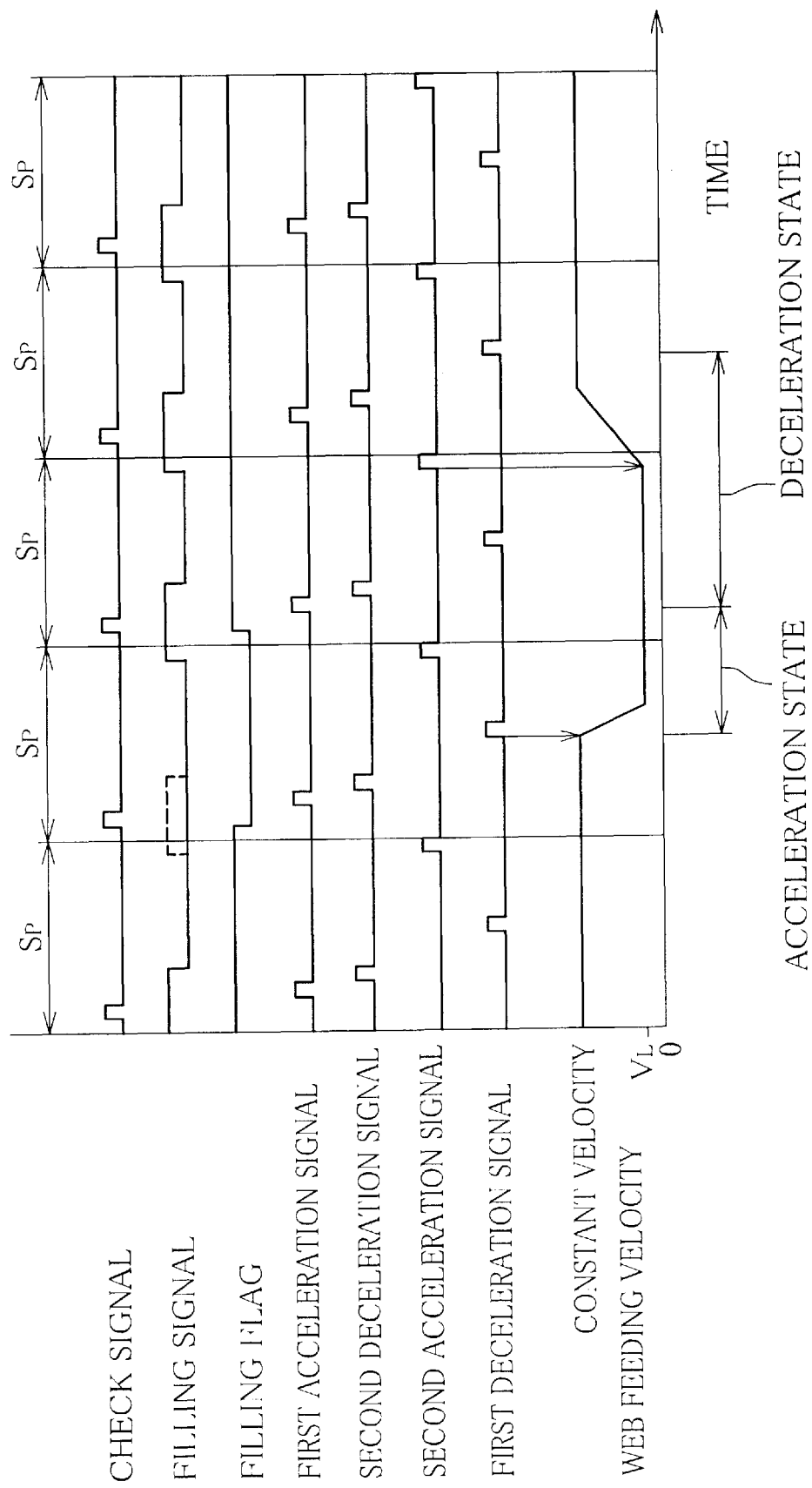
FIG. 18 is a timing chart related to the web feeding control which is performed when a deceleration mode and an acceleration mode are performed in sequence.

Subsequently, the controller 50 executes step S30 in FIG. 8 from step S92, in which case the determination result at step S30 is true. Accordingly, the controller 50 executes the flow of FIG. 15 from step S30 without executing the aforementioned second deceleration mode (step S73) for the web F. In other words, the feeding of the web F immediately proceeds from a first deceleration mode interrupted state to a first acceleration mode interrupted state without stopping feeding the web F, as shown in FIG. 18.

In this event, since the determination result at step S90 in the flow of FIG. 15 becomes true, the controller 50 executes step S93 and all the steps onward. At step S93, the controller 50 determines whether or not the second acceleration signal is generated, similarly to step S32. When the determination result at this step is true, the web F is fed in the second acceleration mode (step S94). Subsequently, the controller 50 resets the switching flag (step S95), followed by execution of step S40 in FIG. 8, i.e., the flow of FIG. 16.

When the controller 50 executes the second acceleration mode at step S94, the second acceleration rate for the web F is newly set. The second acceleration rate in this event is different from the second acceleration rate set at step S33. More specifically, the second acceleration rate at step S94 is set in consideration of the fact that the web F is fed continuously without going through the second deceleration mode of the deceleration state and the first acceleration mode of the acceleration state. Nevertheless, it goes without saying that even in this case, the length of the fed web F during the deceleration state and acceleration state is coincident with the length of one bag P.

As described above, in a situation where the "no-filling" of articles occurs only once, the feeding of the web F is not stopped, so that the machine is prevented from significantly degrading its packing capability.

In the aforementioned deceleration state, the interruption of the first deceleration mode and the second deceleration mode may be omitted. In this implementation, the first deceleration mode is only executed in the deceleration state which is completed at the time the feeding of the web F is stopped.

Likewise, in the acceleration state, the first acceleration mode and the interruption of the first acceleration mode may also be omitted. In this implementation, the acceleration state is started at the time the filling flag is set (for example, at the time the first acceleration signal is generated), and is terminated at the time the velocity of the fed web F is stabilized at the constant velocity (see the broken line in FIG. 6). Even in this case, the period of the acceleration state is longer than the unit packing period $S_P$.

Further, when the filling flag is again set during an interruption of the first deceleration mode, the acceleration mode may be immediately executed for accelerating the velocity of the fed web F from the interrupted state of the first deceleration mode to the constant velocity.

The invention thus described, it will be obvious that the same may be varied in many ways. Such variations are not to be regarded as a departure from the spirit and scope of the invention, and all such modification as would be obvious to one skilled in the art are intended to be including within the scope of the following claims.

What is claimed is:

1. A packing material feeding apparatus for a vertical-type bag form-fill-sealing machine, said machine, when in a normal operation, feeding continuously a tubular packing material along a filling tube at a constant velocity and continuously forming a center seal on the packing material, while repeatedly filling articles into the packing material, forming a top seal on the packing material, and cutting the packing material to produce one bag every unit packing period, said apparatus comprising:

a feeding device for feeding the packing material; and a controller for controlling a packing material feeding velocity through said feeding device, said controller including a deceleration state for decelerating the packing material feeding velocity from the constant velocity when the articles are not filled in a unit packing period; and an acceleration state for increasing the packing material feeding velocity to said constant velocity when filling of the articles is resumed after starting said deceleration state, wherein said acceleration state is executed using a period equal to or longer than said unit packing period.

2. The apparatus according to claim 1, wherein said deceleration state includes a deceleration interruption mode for temporarily interrupting said deceleration of the packing material to maintain the packing material feeding velocity at a uniform velocity.

3. The apparatus according to claim 2, wherein said deceleration state further includes a first deceleration mode for reducing the packing material feeding velocity from said constant velocity to a velocity in said deceleration interruption mode, and a second deceleration mode for reducing the packing material feeding velocity until the packing material is stopped when said deceleration interruption mode is terminated.

4. The apparatus according to claim 3, wherein said acceleration state includes a first acceleration mode for increasing the packing material feeding velocity from said packing material stopping state to a velocity in said acceleration interruption mode, and a second acceleration mode for increasing the packing material feeding velocity to said constant velocity when said acceleration interruption mode is terminated.

5. The apparatus according to claim 4, wherein the packing material feeding velocity is equal in said deceleration interruption mode and in said acceleration interruption mode.

6. The apparatus according to claim 5, wherein said controller directly executes said acceleration interruption mode from said deceleration interruption mode when the filling of the articles is resumed in a unit packing period next to a unit packing period in which the filling operation of the articles is absent.

7. The apparatus according to claim 6, wherein said controller matches the total length of the fed packing material in said deceleration state and said acceleration state with a length required to produce one bag.

8. The apparatus according to claim 1, wherein said acceleration state includes an acceleration interruption mode for temporarily interrupting said acceleration of the packing material, and maintaining the packing material feeding velocity at a uniform velocity.

9. The apparatus according to claim 8, wherein said acceleration state includes a first acceleration mode for increasing the packing material feeding velocity from said packing material stopping state to a velocity in said acceleration interruption mode, and a second acceleration mode for increasing the packing material feeding velocity to said constant velocity when said acceleration interruption mode is terminated.

10. The apparatus according to claim 1, wherein said controller matches the total length of the fed packing material in said deceleration state and said acceleration state with a length required to produce one bag.

11. A vertical-type bag form-fill-sealing machine comprising:

a feeding device for feeding continuously a tubular packing material along a filling tube at a constant velocity;

a center sealer for continuously forming a center seal on the packing material, said center seal connecting both edges of the packing material;

a top sealer arranged for reciprocating along the packing material, said top sealer forming a top seal on the packing material and cutting the packing material to produce one bag every packing cycle determined for a normal operation of said machine, while articles are repeatedly filled into the packing material; and a controller for controlling a feeding velocity of the packing material through said feeding device, said controller including a deceleration state for decelerating the feeding velocity from said constant velocity when the articles are not filled in a packing cycle; and an acceleration state for increasing the feeding velocity to said constant velocity when filling of the articles is resumed after said deceleration state has started, wherein said acceleration state is executed using a period equal to or longer than said packing cycle.

* * * * *